(12) United States Patent
Xu et al.

(10) Patent No.: US 8,065,124 B2
(45) Date of Patent: Nov. 22, 2011

(54) METHOD FOR PREDICTING MICRO-TOPOGRAPHIC DISTRIBUTION OF TERRAIN

(75) Inventors: Di Xu, Beijing (CN); Meijian Bai, Beijing (CN); Yinong Li, Beijing (CN); Shaohui Zhang, Beijing (CN); Fuxiang Li, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 513 days.

(21) Appl. No.: 12/176,387

(22) Filed: Jul. 20, 2008

(65) Prior Publication Data
US 2009/0024371 A1    Jan. 22, 2009

(30) Foreign Application Priority Data

Jul. 19, 2007   (CN) .......................... 2007 1 0130712

(51) Int. Cl.
| | |
|---|---|
| G06F 7/60 | (2006.01) |
| G06F 7/64 | (2006.01) |
| G06F 17/10 | (2006.01) |
| G06F 17/11 | (2006.01) |
| G06F 7/48 | (2006.01) |
| G06G 7/68 | (2006.01) |
| G01V 3/38 | (2006.01) |

(52) U.S. Cl. ..................................... 703/6; 703/2; 702/5
(58) Field of Classification Search ................... 703/2, 6; 702/5
See application file for complete search history.

(56) References Cited

U.S. PATENT DOCUMENTS
2001/0004726 A1* 6/2001 Lambrecht ........................ 702/5

OTHER PUBLICATIONS

Holmes et al. "Error in a USGS 30-meter digital elevation model and its impact on terrain modeling", 2000, Journal of Hydrology 233, pp. 154-173.*
Freeman et al. "Evaluating Krigin as a Tool to Improve Moderate Resolution Maps of Forest Biomass", Oct. 21, 2006, Environ Monit Assess 128, pp. 395-410.*
"The Standard Deviation and the Distribution of Data Values", May 5, 2004, 3 pages, accessed at http://www.pages.drexel.edu/~tpm23/.../EmpiricalTchebysheff.pdf.*
Hengl et al. "Reduction of errors in digital terrain parameters used in soil-landscape modelling", 2004, International Journal of Applied Earth Observation and Geoinformation 5, pp. 97-112.*

* cited by examiner

*Primary Examiner* — Kamini S Shah
*Assistant Examiner* — Suzanne Lo
(74) *Attorney, Agent, or Firm* — Matthias Scholl P.C.; Matthias Scholl

(57) ABSTRACT

A method for irrigating terrain comprising the following steps: generating field surface relative elevation data set using Monte-Carlo simulation; adjusting the simulation data set to ensure it falls in a reasonable numerical range; adjusting the data set to establish certain spatial dependence using Kriging interpolation method; and making further statistical characteristics parameter modification to the data set, so that the final corrected field surface relative elevation data shares the same or similar statistics characteristics parameters as the initial simulation. The method factors in both the randomness and spatial dependence of the field relative elevation distribution, which brings the simulation result closer to the actual micro-topography.

4 Claims, 5 Drawing Sheets

METHOD FOR PREDICTING MICRO-TOPOGRAPHIC DISTRIBUTION OF TERRAIN

CROSS-REFERENCE TO RELATED APPLICATIONS

This application claims priority benefits to Chinese Patent Application No. 200710130712.5 filed Jul. 19, 2007, the contents of which are incorporated herein by reference.

BACKGROUND OF THE INVENTION

1. Field of the Invention

This invention relates to predicting micro-topographic distribution of a terrain, and more particularly to a method for irrigating terrain comprising predicting micro-topographic distribution thereof. For any given field parameters, the method factors in both the randomness and the spatial dependence of the field relative to the elevation distribution when generating micro-topography spatial stochastic data.

2. Description of the Related Art

Field micro-terrain is the terrain undulation in relation to the field designed surface. Its spatial variability is determined by the various nodes on the field surface and their relative elevation spatial variability. A key parameter that quantifies micro-topography's spatial variability is the standard deviation $S_d$ of relative elevation calculated from the field surface nodes. Standard deviation is a statistical parameter that measures dispersion between each node's relative elevation value and means calculated from all nodes' relative elevation values. Relative elevation is the elevation values of all nodes in relation to the field designed surface. The spatial variability of the surface micro-topography has significant impact to the surface irrigation flow movement. It is one of the key factors that affect the performance of a surface irrigation system.

The existing methodologies usually rely on field survey to collect surface relative elevation data, and then use numerical simulation to analyze and evaluate the impact of specific micro-topography spatial variability on field irrigation system's performance. However, using field survey method to collect surface relative elevation information is time consuming, costly and very difficult to get a wide range of relative elevation individuals. Its limitation in the numerical range and lack of spatial distinction negatively affect its flexibility and systemic when using simulation approaching to analyze and evaluate the relationship between micro-topography's spatial variability and filed irrigation performance. Therefore, it is necessary to develop a micro-topography distribution stochastic simulation methodology, which can produce a reliable and valid simulation result that can support the analysis and evaluation afterwards.

The probability distribution for filed surface relative elevation follows normal distribution. This means, when the statistical characteristics parameters (mean and standard deviation $S_d$) for field surface relative elevation is given, one can use Monte-Carlo simulation to generate relative elevation data of the along vertical slope, and then the micro-topography spatial variability information can be obtained. Such methodology is documented, e.g., in Transactions of ASAE, 1999, 42(4): P995-1008, "Assessing the potential for modern surface irrigation in Egypt", as well as in "Research and application on new water-saving irrigation technique in the field" (China Agriculture Publishing House, 2002).

However, such method overlooks the transverse variability among the surface relative elevation data. It only factors in the randomness among the surface relative elevation data distribution, but overlooks its spatial dependence. As a result, the simulated data does not accurately reflect the actual spatial variability of the surface relative elevation. Also, the conventional method fails to account for the fact that theoretically more than one set of relative elevation data can be generated during the simulation if using the same set of statistical characteristics parameters. This poses new constraint on minimal sample size required for the simulation.

Assuming all possible field micro-topography distributions that meet a given set of statistical characteristics parameters as the total universe, and a single field micro-topography distribution as an individual, one must determine the minimum number of individuals needed for the simulation, so that the sampled individuals are representative to the whole universe. The number individuals that can represent the total universe are called sample size. Therefore, it is important to take both the randomness and spatial dependence of the field relative elevation distribution into the consideration, and develop new method to simulate two-dimensional surface micro-topography spatial variability, and solve the minimum sample size problem during the simulation process.

SUMMARY OF THE INVENTION

The invention described here is an improved methodology in simulating filed micro-topography spatial variability. The method factors in both the randomness and spatial dependence of the field relative elevation distribution. The method also uses statistical analyses result to determine functional relation that describe various types of basin field relative elevation spatial dependence, and formulate formulas that evaluate spatial variability properties of relative elevation for various types of allotment. After adjusting simulated relative elevation data, which is generated using Monte-Carlo simulation, the method also comprises calculation of a minimum sample size for the simulated data set. Such method provides an effective way to leverage numerical simulation in analyzing and evaluating the impact of micro-topography spatial variability on surface irrigation system.

Technical Scheme:

A methodology used in field micro-topography distribution simulation. It comprises following steps: 1) generating field relative elevation data set using Monte-Carlo simulation; 2) based on the given basin condition, adjusting the simulation data set and ensure it falls in a reasonable numerical rang; 3) based on the given basin condition, calculating field surface relative elevation spatial variability property parameter, determining the structure functional relationship among the field surface relative elevation distribution, and using Kriging interpolation to make spatial dependence adjustment to the data set, and establishing certain spatial dependence; and 4) making further statistical characteristics parameter adjustment, so that the final corrected field relative elevation data share the same or similar statistics characteristics parameters as the initial value generated from the simulation step.

In certain classes of this embodiment, regression analysis is applied first to determine the functional relation that describes various types of basin field relative elevation spatial variability. Spherical model is used in calculating the functional relation. Also, the corresponding spatial variability properties can be estimated based on the parameters of different types of the allotment.

In certain classes of this embodiment, in step 2) (the data range adjustment to the simulated field relative elevation data set) the target range is set at $[\bar{z}-3S_d, \bar{z}+3S_d]$, in which $\bar{z}$ is the mean of the relative elevation, and $S_d$ is the standard deviation of the relative elevation.

In certain classes of this embodiment, following parameters are used in step 3 to adjust the data:

| Allotment Type | Field Relative Elevation Spatial Variability Characteristics Parameters | | |
|---|---|---|---|
| | $C_0/cm^2$ | $(C_0 + C)/cm^2$ | R/m |
| Strip Allotment | $0.21S_d^2$ | $S_d^2$ | 0.18L + 1.53 |
| Narrow Allotment | $0.34S_d^2$ | $S_d^2$ | 0.21L − 4.11 |
| Wide Allotment | $0.32S_d^2$ | $S_d^2$ | 16.69A + 5.26 |

$S_d$ is the standard deviation of the relative elevation;
$C_0$ is the nugget;
C is structure variance;
$(C_0 + C)$ is the sill;
R is the range;
L is the length;
A is the area of the field.

In certain classes of this embodiment, the method used in adjusting simulated relative elevation data, comprises:

A. enter spatial structure function, mean $\bar{z}$, standard deviation $S_d$, length L, width W, row spacing dy, column spacing dx;
B. select the node i for simulation;
C. generate random number $r_i$;
D. calculate node's elevation $z_i^0$;
E. if node's elevation $z_i^0$ meets the condition $\bar{z}-3S_d \leq z_i^0 \leq \bar{z}+3 S_d$, then continue to next step; else return to step c;
F. if node i meets the condition i=(L/dy+1)×(W/dx+1), then continue to next step; else return to step A and select the next node for simulation;
L is the allotment's length;
W is the width;
dy is the row spacing for the selected node's elevation;
dx is the column spacing for the selected node's elevation;
G. complete spatial dependence correction, mean correction and standard deviation correct; and
H. complete stochastic simulation, and save the field surface micro-topography data file.

The method factors in both the randomness and spatial dependence of the field relative elevation distribution, which results in a simulation result that is closer to the actual microtopography. Such method provides an effective way to generate more accurate simulation result, which result in producing more accurate evaluation on the impact of microtopography spatial variability on surface irrigation system.

BRIEF DESCRIPTION OF THE DRAWINGS

The following demonstration using a real example intends to provide further details on the invention.

DETAILED DESCRIPTION OF THE INVENTION

Figure 1:
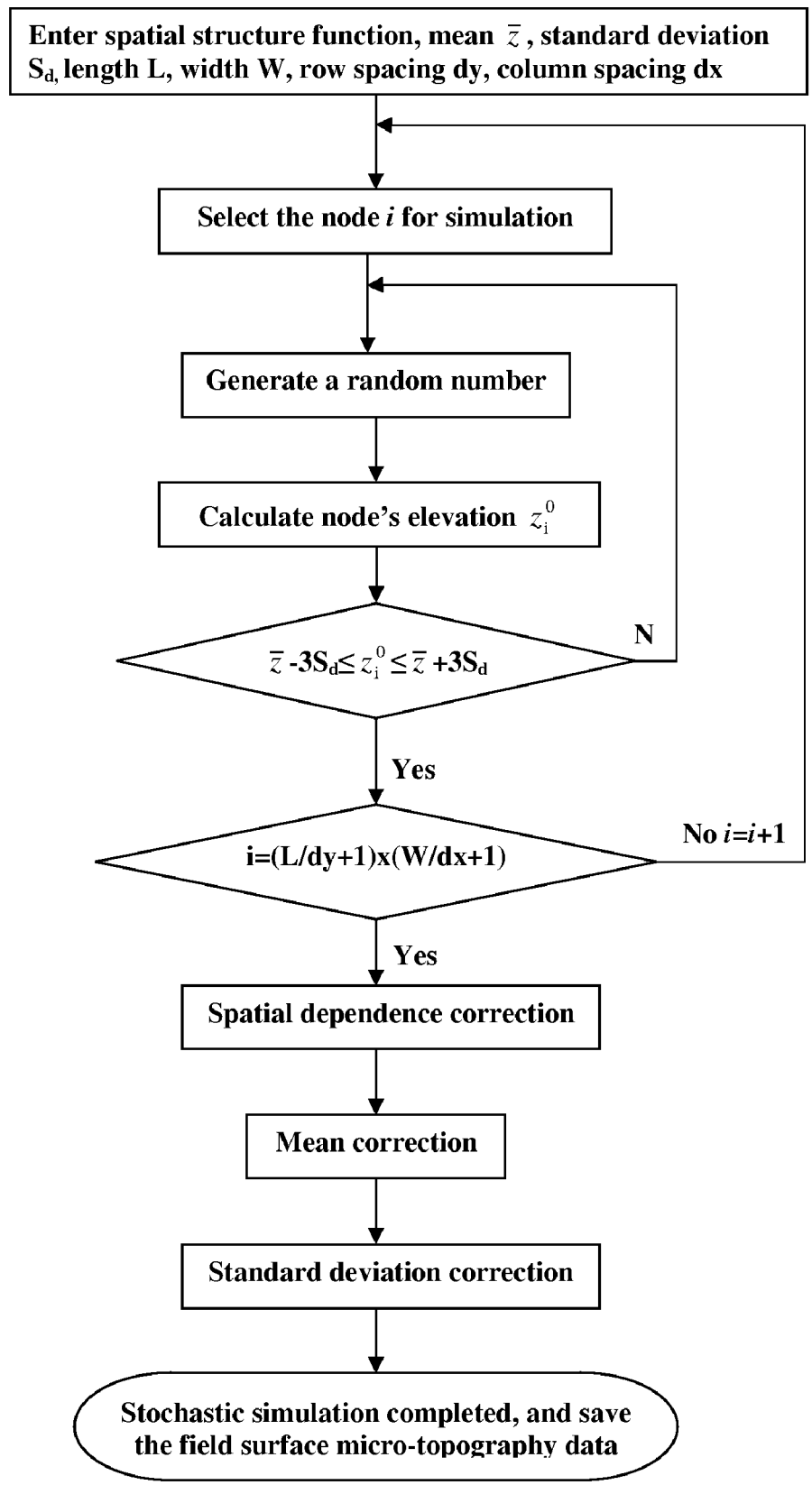
FIG. 1 is a flow chart that demonstrate simulation procedure that generates field surface relative elevation data and adjustment made during the procedure according to one embodiment of the invention.

The method according to one embodiment of the invention comprises three components: I) Using geological statistics methodology, analyze and summarize the field surface relative elevation spatial variability, and formulate empirical formulas using field parameters to estimate surface relative elevation spatial variability property for different types of allotment; II) Generate field relative elevation data set using Monte-Carlo simulation, and then use Kriging interpolation to make adjustments to data range, spatial dependence and statistics characteristics parameters; and III) Using principals and methods from probability statistics, for a given statistics characteristics parameter, determine the minimum sample size required for simulated individuals that can represent the overall field surface relative elevation distribution.

I. Analyze the field surface relative elevation spatial variability, and formulate empirical formulas to estimate surface relative elevation spatial variability property.

1) Statistical Analysis on Field Surface Relative Elevation Data

Using the innovative methodology, a total of 116 pieces of allotment from different types of irrigation territories in North China Plain, based on its corresponding length to width ratio and absolute width, are categorized into three categories (see Table 1):

Strip Allotment: length to width ratio is greater than 3 and absolute width is less than 10 m;
Narrow Allotment: length to width ratio is greater than 3 and absolute width is greater than or equal to 10 m;
Wide Allotment: length to width ratio is less than 3 and absolute width is greater than or equal to 10 m.

Table 2 shows the statistical characteristics parameters of field surface relative elevation information on 3 types of allotment based on actual field survey results.

TABLE 1

| Statistical Characteristics Parameters for Different Types of Allotment | | | | | | |
|---|---|---|---|---|---|---|
| Allotment | Strip Allotment | | Narrow Allotment | | Wide Allotment | |
| Parameters | Range | Mean | Range | Mean | Range | Mean |
| Length L (m) | 30-278 | 100 | 50-300 | 150 | 20-200 | 100 |
| Width W (m) | 1.9-10.0 | 5 | 10.0-35.0 | 20 | 10.0-80.0 | 50 |
| Area A (m²) | 100-1700 | 400 | 500-9300 | 3300 | 200-16000 | 6000 |
| Surface i (‰) | 0.1-4.3 | 1.0 | 0.0-3.6 | 1.0 | 0.0-3.3 | 1.0 |

TABLE 2

Actual Statistical Characteristics Parameters on Field Surface Relative Elevation Data from Field Survey

| Allotment Type | Mean $\bar{z}$ (cm) Variation Range | Mean | Standard Deviation $S_d$ (cm) Variation Range | Mean | Coefficient of Variance $C_v$ Variation Range | Mean |
|---|---|---|---|---|---|---|
| Strip Allotment | 1.30-8.50 | 3.83 | 0.80-4.50 | 1.93 | 0.30-0.73 | 0.51 |
| Narrow Allotment | 3.60-18.60 | 8.93 | 1.20-5.30 | 3.11 | 0.19-0.59 | 0.37 |
| Wide Allotment | 3.40-11.50 | 7.25 | 1.50-4.00 | 2.53 | 0.25-0.60 | 0.37 |

As shown in Table 2, the mean, standard deviation and coefficient of variance are the three frequently used statistical parameters, which are considered to belong to statistics terminology. The statistical values in line 1 are related to each field surface node's relative elevation. For an example, the mean stands for the average of relative elevation values for all field surface nodes in a particular piece of allotment. Each piece of allotment has its own set of statistical characteristics parameters. There are multiple pieces of allotment under each Allotment Type. The mean in line 2 refers to the average of relative elevation values for different pieces of allotment.

The formula to calculate standard deviation is as follows:

$$S_d = \sqrt{\frac{\sum_{1}^{n}(x_i - \bar{x})}{n-1}}$$

The formula to calculate coefficient of variance is as follows:

$$Cv = \frac{S_d}{\bar{x}}$$

$x_i$ stands for the ith node's relative elevation value;
$\bar{x}$ is the mean of relative elevation value for all the nodes;
n is the number of nodes on the field surface.

2) Evaluate Field Surface Relative Elevation Data Distribution

Based on the relative elevation data from actual field survey, use one-sample K-S test to examine its probability density function and see if it passes the normality examination. The result indicated that when confidence level is set at the significant level of α=0.05, the probability density function for all types of allotments' field surface relative elevation follows normal distribution.

3) Corresponding Field Surface Relative Elevation Spatial Variability Structure

When using geo-statistical methods to conduct semi-variance analysis on field surface relative elevation data for different types of allotment, empirical semi-variance function γ(h) is used to describe the spatial variability structure function of the field surface relative elevation variable.

$$\gamma(h) = \frac{1}{2N}\sum_{i=1}^{N}[Z(z_i) - Z(z_i + h)]^2 \quad (1)$$

$z_i$ is the space coordinate position on a given point;
$Z(z_i)$ is the field surface relative elevation variable value at point $z_i$;
N is the number of measured point pairs;
h is the distance spacing between each measured point pair.

Spherical model and its nested structure format is frequently used in geological statistical analysis, since it match most empirical semi-variance functions that based on field experiment individual data.

$$\gamma(h) = \begin{cases} 0 & h = 0 \\ C_0 + C \cdot \left(\frac{3}{2} \cdot \frac{h}{R} - \frac{1}{2} \cdot \frac{h^3}{R^3}\right) & 0 < h \leq R \\ C_0 + C & h > R \end{cases} \quad (2)$$

$C_0$ is the nugget;
C is structure variance;
($C_0+C$) is the sill;
R is the range.

Using the indicator of goodness of fit IGF to measure how well the theoretical semi-variogram fits the empirical semi-variogram, based on the minimum differentiation principle, one can calculate the corresponding minimum IGF for field surface relative elevation theoretical semi-variogram, $$IGF = \sum_{i=0}^{n} \frac{P(i)}{\sum_{j=0}^{n}P(j)} \cdot \frac{D}{d'(i)} \cdot \left[\frac{\gamma(i) - \hat{\gamma}(i)}{\sigma^2}\right]^2 \quad (3)$$

n is the number of lags;
D is the maximum distance;
P(i) is the number of pairs for lag i;
d'(i) is the distance for lag i;
γ(i) is the empirical semi-variogram for lag i;
$\hat{\gamma}(i)$ is the theoretical semi-variogram for lag i;
σ is the variance.

Table 3 shows calculated results from using formula (2) on different types of basin field surface relative elevation spatial variability property parameters and its statistical characteristic parameters. The results from semi-variance analysis on field surface relative elevation data from different types of allotment indicated that all the empirical semi-variance functions can be fitted using spherical model or exponential model. More than 93% of the functions are best fitted using spherical model, the rest are best fitted using exponential model. In the instance when best fitted model is exponential model, analysis on error values by replacing exponential model with spherical model, one would find that error mostly occurred when distance spacing value is large. When distance spacing value is small, replacing exponential model with spherical model showed good results. Since small distance spacing variance is the majority, it is concluded that it is a feasible approach to replace exponential model with spherical model. Therefore, the methodology described here uses spherical model exclusively when describing field surface relative elevation spatial variability.

TABLE 3

Statistical Characteristics Parameters of Field Surface Relative Elevation Spatial Variability Property Parameters for Different Types of Allotment

| Allotment Type | Statistical Characteristics Parameters | Field Surface Relative Elevation Spatial Variability Property Parameters | | | |
|---|---|---|---|---|---|
| | | $C_0$ (cm²) | $(C_0 + C)$ (cm²) | $[C_0/(C_0 + C)]$ | R (m) |
| Strip Allotment | Maximum | 2.20 | 22.00 | 0.67 | 60.00 |
| | Minimum | 0.00 | 0.80 | 0.00 | 5.00 |
| | Mean | 0.58 | 4.66 | 0.21 | 16.69 |
| | Coefficient Variance | 0.52 | 0.47 | 0.27 | 0.47 |
| Narrow Allotment | Maximum | 8.00 | 29.00 | 0.67 | 58.00 |
| | Minimum | 0.00 | 1.45 | 0.00 | 6.00 |
| | Mean | 2.95 | 10.56 | 0.34 | 19.91 |
| | Coefficient Variance | 0.63 | 0.62 | 0.64 | 0.54 |
| Wide Allotment | Maximum | 5.00 | 15.40 | 0.63 | 65.00 |
| | Minimum | 0.00 | 2.15 | 0.00 | 4.00 |
| | Mean | 1.92 | 6.89 | 0.32 | 25.83 |
| | Coefficient Variance | 0.75 | 0.53 | 0.56 | 0.67 |

4) Correlation Between Allotment Parameters and Field Surface Relative Elevation Spatial Variability Property Parameters Table 4 shows the correlation analysis results using allotment parameters and its corresponding field surface relative elevation spatial variability property parameters. Allotment length L, width W, area A and node spacing d are correlated to range R. The standard deviation for field surface relative elevation $S_d$ is highly correlated to sill $(C_0+C)$. Field surface relative elevation node spacing d is somewhat correlated on nugget $C_0$.

5) Formulate Empirical Formula using Field Parameters to Estimate Surface Relative Elevation Spatial Variability Property Based on the correlation analysis result between allotment parameters(allotment's length L, area A and standard deviation of field surface relative elevation $S_d$) and field surface relative elevation spatial variability property parameters, empirical functional relationship (see Table 5) can be established, and field surface relative elevation spatial variability property parameters can be calculated (including nugget $C_0$, sill $(C_0+C)$, range R). The methodology here listed out the empirical formulas to calculate field surface relative elevation using allotment parameters. This provided theoretical basis for adjusting spatial dependence on field surface relative elevation simulation data.

TABLE 4

A Correlation Analysis on Different Types of Allotment Parameters and Its Corresponding Field Surface Relative Elevation Spatial Variability Property Parameters

| Allotment Type | Allotment Parameters | Field Surface Relative Elevation Spatial Variability Property Parameters | | | |
|---|---|---|---|---|---|
| | | $C_0$ | $(C_0 + C)$ | $[C_0/(C_0 + C)]$ | R |
| Strip Allotment | Length L | −0.29 | 0.40** | −0.30 | 0.98** |
| | Width W | −0.28 | 0.21 | −0.36* | 0.05 |
| | Area A | −0.34* | 0.42** | −0.38 | 0.90** |
| | Standard Deviation $S_d$ | −0.16 | 0.98** | −0.35* | 0.39* |
| | Node Spacing d | −0.59* | 0.31* | −0.39* | 0.78** |
| Narrow Allotment | Length L | 0.26 | 0.56** | −0.01 | 0.84** |
| | Width W | 0.19 | 0.54** | −0.18 | 0.50** |
| | Area A | 0.11 | 0.63** | −0.19 | 0.72** |
| | Standard Deviation $S_d$ | 0.13 | 0.94** | −0.33 | 0.65** |
| | Node Spacing d | −0.69** | 0.34* | −0.54** | 0.67** |
| Wide Allotment | Length L | 0.33* | 0.21 | 0.05 | 0.89** |
| | Width W | 0.25 | 0.22 | 0.01 | 0.91* |
| | Area A | 0.24 | 0.16 | 0.01 | 0.93** |
| | Standard Deviation $S_d$ | 0.17 | 0.93** | −0.43** | 0.35* |
| | Node Spacing d | −0.70** | 0.21 | −0.31 | 0.87** |

*Significant level = 0.05;
**Significant level = 0.01.

TABLE 5

Empirical formula on Calculating Field Surface Relative Elevation Spatial Variability Property Parameters for Different Types of Allotment

| Allotment Type | Field Surface Relative Elevation Spatial Variability Property Parameters | | |
|---|---|---|---|
| | $C_0$/cm² | $(C_0 + C)$/cm² | R/m |
| Strip Allotment | $0.21S_d^2$ | $S_d^2$ | 0.18L + 1.53 |
| Narrow Allotment | $0.34S_d^2$ | $S_d^2$ | 0.21L − 4.11 |
| Wide Allotment | $0.32S_d^2$ | $S_d^2$ | 16.69A + 5.26 |

II. Generate field relative elevation data set using Monte-Carlo simulation, and then use Kriging interpolation to make adjustments to data range, spatial dependence and statistics characteristics parameters.

Given specified statistical characteristics parameters (mean $\bar{z}$ and standard deviation $S_d$) for field surface relative elevation, one can use Monte-Carlo simulation to generate field surface relative elevation data, which only ensure its mathematical randomness. The simulated the result does not have any specified physical meaning or practical values. Since the actual field surface relative elevation distribution has both the randomness and spatial dependence features, based on the physical features of micro-topography physical features, one needs to make further adjustments to the data set on value range, spatial dependence and statistical characteristics parameters. The end result should make the simulated surface micro-topography distribution, in theory, closer to the actual constraints. The random generation of field surface relative elevation and further adjustment is described in the flow chart (see FIG. 1). It comprises following steps:

a. Enter spatial structure function, mean $\bar{z}$, standard deviation $S_d$, length L, width W, row spacing dy, column spacing dx;
b. Select the node i for simulation;
c. Generate random number $r_i$;
d. Calculate node's elevation $z_i$;
e. If node's elevation $z_i^0$ meets the condition $\bar{z}-3S_d \leq z_i^0 \leq \bar{z}+3 S_d$, then continue to next step; else return to step c;

f. If node i meets the condition i=(L/dy+1)×(W/dx+1), then continue to next step; else return to step A and select the next node for simulation;

L is the allotment's length;
W is the width;
dy is the row spacing for the selected node's elevation;
dx is the column spacing for the selected node's elevation;

g. Complete spatial dependence correction, mean correction and standard deviation correct;

h. Stochastic simulation completed, and save the field surface micro-topography data file.

Figure 2:
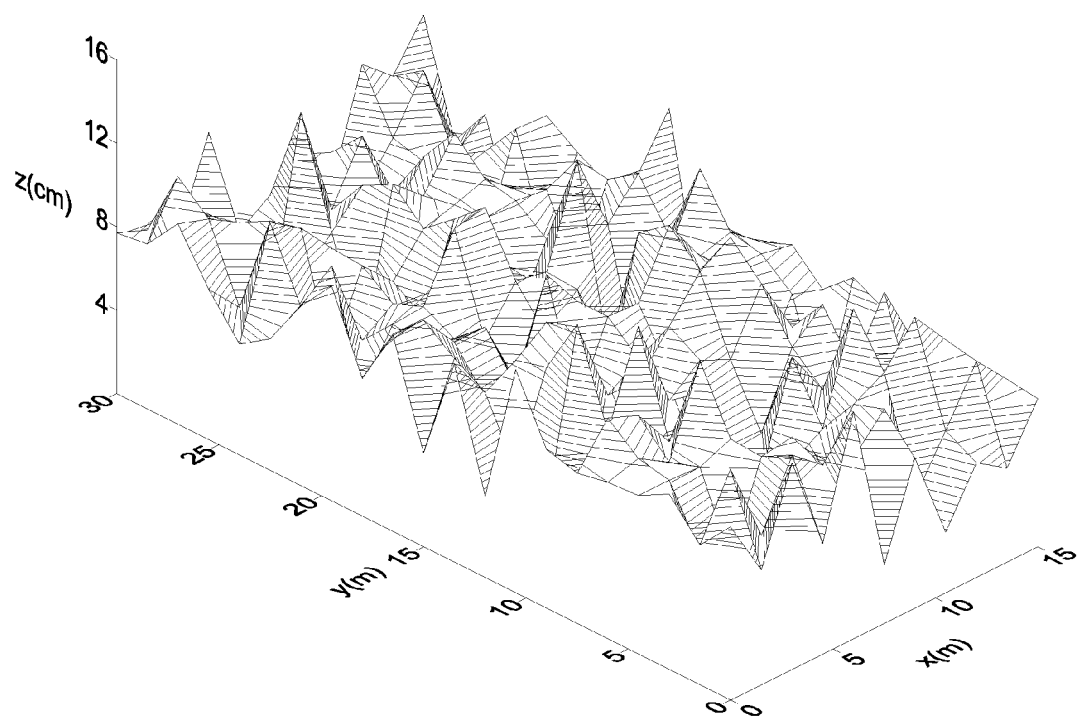
FIG. 2 is an initial random generation of field surface relative elevation distribution graph according to another embodiment of the invention.
Figure 3:
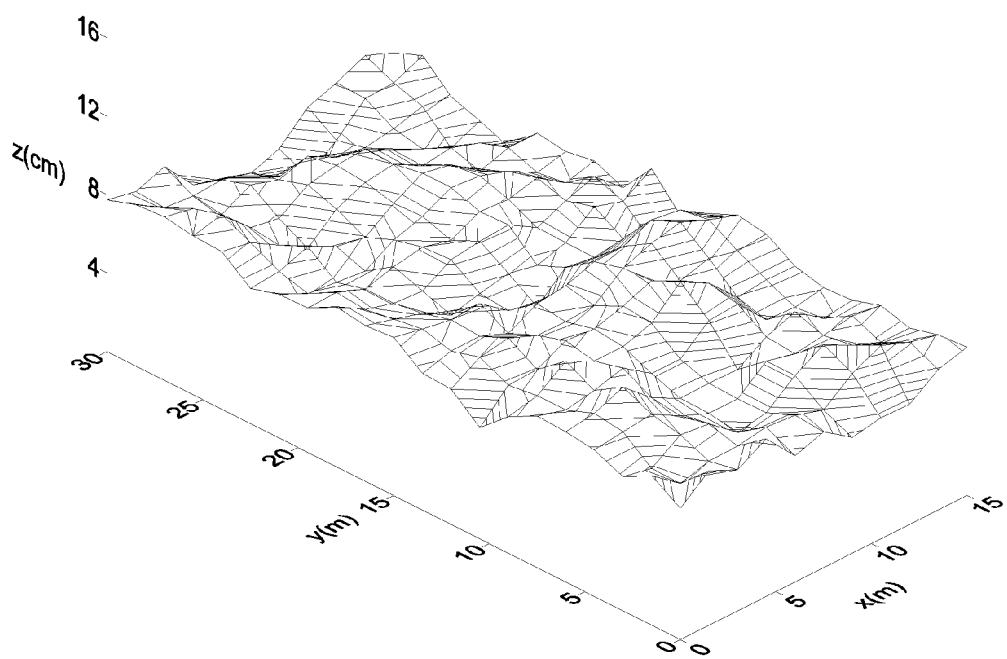
FIG. 3 is a field surface relative elevation distribution graph after data range and spatial dependence adjustment according to another embodiment of the invention.
Figure 4:
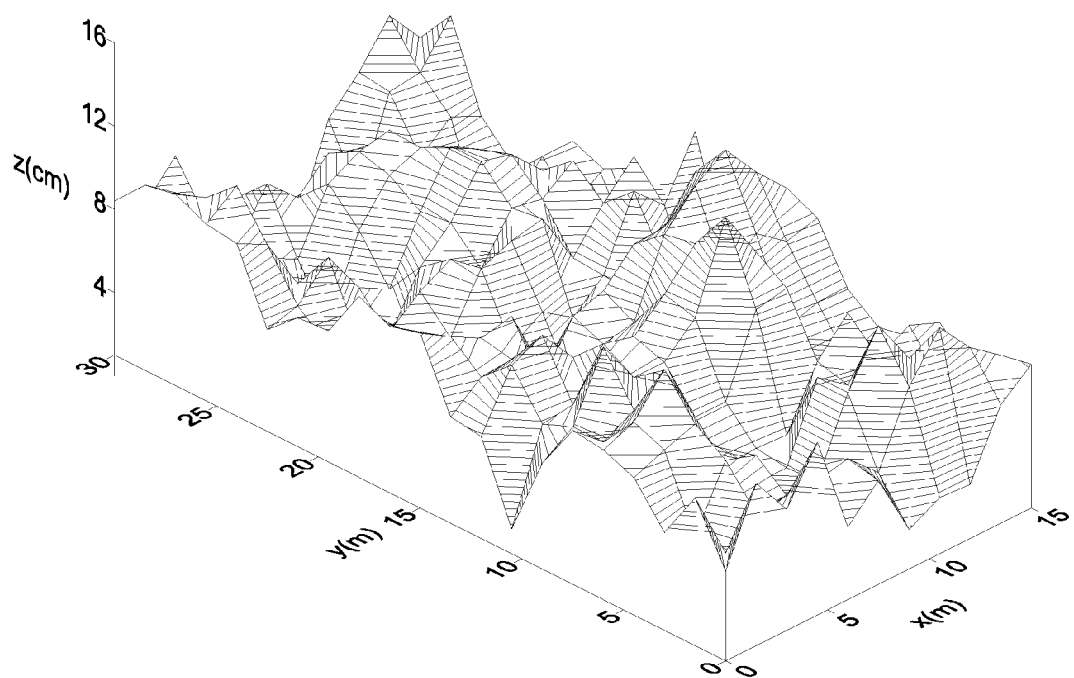
FIG. 4 is a field surface relative elevation distribution graph after statistical feature based parameter modification adjustment according to another embodiment of the invention.

FIGS. 2-4 show the field micro-topography spatial variability changes as data is been adjusted.

(1) Randomly Generate Field Surface Relative Elevation Data

The detailed steps of generating field surface relative elevation data via Monte-Carlo simulation are as follows:

Based on specified field surface relative elevation statistical characteristics parameters (mean $\bar{z}$ and standard deviation $S_d$), length L, width W, elevation node row spacing dy and column spacing dx, first determine the number of elevation nodes needed be randomly generated. Next, randomly generate n evenly distributed random numbers $r_i$ ($r_i$ is between [0, 1]), which created a corresponding set $Y=(r_1, r_1, \ldots, r_n)$. Then, follow formula in (4), using iterated mode to calculate any given random value $r_i$ and its corresponding node's elevation value $z_i^0$. One by one, one could expect to generate a set $Z=(z_1^0, z_2^0, \ldots, z_i^0, \ldots, z_n^0)$, in which all the filed surface relative elevation values from different nodes within the allotment are included. $z_i^0$ is the randomly generated field surface relative elevation at the ith node.

$$F(z) = \int_{-\infty}^{z} \frac{1}{\sigma\sqrt{2\pi}} \exp\left[-\frac{1}{2}\left(\frac{z-\mu}{\sigma}\right)^2\right] dz = Y \quad (4)$$

z is field surface relative elevation;
$\mu$ is the mean of field surface relative elevation;
$\sigma$ is the standard deviation of field surface relative elevation.

(2) Adjusting the Range

Using Monte-Carlo simulation, the randomly generated field surface relative elevation data set usually range from $[-\infty, +\infty]$. However, once taking the requirement from agriculture production activity into consideration, the actual field surface relative elevation data should falls into a limited range. From a practical and a mathematical perspectives, the range should be set between $[\bar{z}-3S_d, \bar{z}+3S_d]$. Any elevation values that are out of such set range should be considered as invalid or false points, and should be replaced by newly generated values using the Monte-Carlo procedure.

(3) Adjusting the Spatial Dependence

Since surface relative elevation data shows certain spatial dependence, using Kriging interpolation method, further adjustment is made to the data set to establish certain spatial dependence. Based on the type of the allotment, its length L, area A and standard deviation of field surface relative elevation $S_d$, choose the corresponding formula in Table 5 to calculate field surface relative elevation spatial variability property parameter, and then determine the structure functional relationship among the field surface relative elevation distribution.

Assuming the ith elevation node (i=1, 2, ... n) requires adjustment, using the elevation information from the surrounding nodes within the range R as reference to calculate optimal unbiased estimation value $Z(z_i^1)$, and replaced the original value $Z(z_i^0)$ on the ith elevation node with value $Z(z_i^1)$.

$$Z(z_i^1) = \sum_{j=1}^{M} \lambda_j Z(z_j^0) \quad (5)$$

$Z(z_j^0)$ is the relative elevation value of node within range R;
M is the number of surrounding nodes within range R from the ith node;
$\lambda_j$ is the spatial position correlation weight of $Z(z_j^0)$, which can be calculated using the field surface relative elevation spatial variability structure functional relationship.

(4) Adjusting the Statistical Characteristics Parameters

Upon the completion of range and spatial dependence adjustments to the field surface relative elevation data, the initial values for data set's statistical characteristics parameters is often changed as well. Therefore, once again, statistical characteristics parameter adjustments are needed for the field surface relative elevation data, so that the adjusted data set would have the same or similar statistical characteristics parameters as the initial values. Formula (6) can be first applied to correct the mean of field surface relative elevation data. Afterwards, apply formula (7) to correct the standard deviation of the data set.

$$z_{i2} = \frac{\bar{z}}{\bar{z}_1} z_{i1} \quad (6)$$

$$z_{i3} = (z_{i2} - \bar{z})\frac{S_d}{S_{d2}} + \bar{z} \quad (7)$$

$z_{i1}$ is the relative elevation value for the ith node after the range and spatial dependence adjustment;
$z_{i2}$ is the relative elevation value for the ith node after adjustment to the mean;
$z_{i3}$ is the relative elevation value for the ith node after the adjustment to the standard deviation;
$\bar{z}$ is the mean of the initial field surface relative elevation data;
$\bar{z}_1$ is the mean of the field surface relative elevation data after the range and spatial dependence adjustment;
$S_d$ is the standard deviation of the initial field surface relative elevation data;
$S_{d2}$ is the standard deviation of the field surface relative elevation data after the range and spatial dependence adjustment.

III. Given a set of statistical characteristics parameters, determine the minimum sample size required for simulated individuals that can represent the overall field surface relative elevation distribution.

Field micro-topography distribution is usually described by the terrain undulation of the micro-terrain and its corresponding spatial variability variability. The standard deviation of field surface relative elevation $S_d$ can be used to quantify the terrain undulation of the micro-terrain. However, for a given $S_d$, the spatial variability of terrain undulation position is not unique. Instead, theoretically an infinite set of field surface relative elevation spatial variability data. Therefore, given the statistical characteristics parameters, one must determine the minimum sample size for the field surface relative elevation simulation, so that the sample size is adequate in representing the overall field micro-topography undulation distribution.

Based constructed numerical simulation test design conditions, establish variation relationship between the statistical characteristics parameters that evaluates field irrigation performance and the sample size of simulated field surface relative elevation data. Calculate the mean and standard deviation of field irrigation performance parameters under the steady variation tendency assumption. Use probability statistics principles and methods, and determine the minimum sample size for field surface relative elevation simulation, which will be adequate in representing the overall field micro-topography undulation distribution.

(1) The Relationship Between the Statistical Characteristics Parameters of Field Irrigation Performance and Sample Size of Field Surface Relative Elevation Simulation.

Allotment Type and standard deviation of field surface relative elevation are the two primary factors for consideration during the numerical simulation test design process. There are three Allotment Types: strip Allotment, narrow Allotment and wide Allotment (see Table 1), and six levels for standard deviation of field surface relative elevation ($S_d$=1 cm, 2 cm, 3 cm, 4 cm, 5 cm and 6 cm). These make a total 18 combination for test designs. Corresponding to each test design combination, using the innovative stochastic simulation methodology described here, randomly generate from 0 to 200 sets of field surface relative elevation data, all of which share the same $S_d$ value but different field micro-topography undulation distribution. Use two-dimensional field irrigation model B2D to simulate field irrigation performance, and the numerical simulation would generate from 0 to 200 sets of data including the average water depth $Z_{avg}$, irrigation efficiency $E_a$, irrigation uniformity CU and other parameters for field irrigation performance review.

Based on 18 different combinations for test design conditions, simulation produced sets of simulated field irrigation performance metrics, such as $Z_{avg}$, $E_a$ and CU. Examine and establish the functional relationship on how standard deviation, mean of irrigation performance changes as the sample size of field surface relative elevation simulation changes. Calculate the mean and standard deviation of the performance parameters under the steady variation tendency assumption (Table 6).

TABLE 6

Mean and Standard Deviation of $Z_{avg}$, $E_a$ and CU under The Steady Variation Tendency Assumption for Different Test Design Condition

| Allotment Type | Field Irrigation Performance Paremeter | Statistical Characteristics Parameters | $S_d$ (cm) 1 | 2 | 3 | 4 | 5 | 6 |
|---|---|---|---|---|---|---|---|---|
| Strip Allotment | $Z_{avg}$ (mm) | Mean | 74.77 | 83.52 | 107.01 | 121.87 | 133.35 | 171.72 |
| | | Standard Deviation | 0.80 | 6.34 | 11.30 | 13.50 | 15.81 | 18.70 |
| | $E_a$ (%) | Mean | 88.92 | 82.67 | 70.90 | 62.94 | 58.52 | 43.65 |
| | | Standard Deviation | 0.18 | 2.00 | 3.50 | 3.69 | 3.80 | 4.11 |
| | CU (%) | Mean | 71.77 | 69.03 | 72.19 | 69.59 | 69.19 | 68.69 |
| | | Standard Deviation | 0.65 | 2.90 | 3.10 | 3.50 | 3.70 | 3.80 |
| Narrow Allotment | $Z_{avg}$ (mm) | Mean | 80.87 | 96.67 | 113.08 | 170.83 | 190.26 | 197.95 |
| | | Standard Deviation | 1.26 | 10.21 | 13.01 | 13.80 | 14.23 | 15.59 |
| | $E_a$ (%) | Mean | 81.60 | 74.14 | 67.21 | 46.71 | 42.37 | 40.32 |
| | | Standard Deviation | 0.41 | 2.47 | 2.90 | 3.10 | 3.20 | 3.42 |
| | CU (%) | Mean | 63.73 | 66.37 | 68.38 | 72.98 | 73.09 | 71.02 |
| | | Standard Deviation | 0.62 | 1.89 | 2.21 | 2.40 | 2.50 | 2.69 |
| Wide Allotment | $Z_{avg}$ (mm) | Mean | 72.66 | 82.23 | 103.89 | 139.31 | 160.98 | 181.28 |
| | | Standard Deviation | 1.05 | 8.44 | 10.25 | 12.37 | 15.37 | 17.02 |
| | $E_a$ (%) | Mean | 90.13 | 82.94 | 71.03 | 56.00 | 48.90 | 43.22 |
| | | Standard Deviation | 0.66 | 2.56 | 2.81 | 3.00 | 3.42 | 3.56 |
| | CU (%) | Mean | 69.42 | 67.09 | 70.32 | 71.24 | 71.10 | 70.75 |
| | | Standard Deviation | 0.65 | 2.35 | 2.49 | 2.79 | 2.87 | 3.06 |

(2) Determine the Minimum Sample Size for Field Surface Relative Elevation Simulation Based on Chebyshev's law of great numbers, under the individual sampling assumption, the mean of the total universe can be replaced by the sample's mean when sample is approaching stability. When the sample size of the simulated field surface relative elevation data increased to a certain degree, the corresponding mean and standard deviation of field irrigation performance parameters, such as $Z_{avg}$, $E_a$ and CU will approach stable values, which means one could used the sample's mean and standard deviation to replace the mean and standard deviation for the total universe.

For independent random variables $X \sim N(\mu, \sigma^2)$, if $X_1, X_2, \ldots X_m$ are all sampled from X, when $\sigma^2$ is known and the confidence level is $\alpha$, one could use interval estimation formula for mean of single-collectivity $\mu$ to estimate the interval of $\mu$, $$\left[\overline{X} - \frac{\sigma}{\sqrt{m}} Z_{\alpha/2}, \overline{X} + \frac{\sigma}{\sqrt{m}} Z_{\alpha/2}\right] \quad (8)$$

The interval length here is $2\sigma \cdot Z_{\alpha/2}/\sqrt{m}$. If the required predetermined precision is $l_0$, and required interval length is within $2l_0$, in another word, $$2\sigma \frac{Z_{\alpha/2}}{\sqrt{m}} \le 2l_0 \quad (9)$$

condition (9) can be rearranged as follow, $$m \ge \left(\sigma \frac{Z_{\alpha/2}}{l_0}\right)^2 \quad (10)$$

Confidence level $\alpha$ is set at $\alpha=0.05$; and $Z_{\alpha/2}$ is the fractile point for $\alpha$ in normal distribution. From Z-table we got $Z_{0.025}=1.96$. $\sigma$ is the standard deviation of the total universe, which can be approximated by the standard deviation value obtained when its corresponding sample approaches a stable value (see Table 6). m is the minimum sample size for the simulated field surface relative elevation data set. When the number of simulated individuals is greater than m, the mean of total universe can be replaced by the sample's mean, which also meets the precision requirement that interval length does not exceed $2l_0$.

Based on the result in Table 6, using inequality (10), the minimum sample size under various simulation test design constraints and various predetermined precision requirement on field irrigation performance parameters is calculated and listed in Table 7. Estimation interval precision $l_0$ stands for the precision requirement for the difference between the sample mean of $Z_{avg}$, $E_a$ and CU and the mean of the total universe, Based on the physical meaning of $Z_{avg}$, $E_a$ and CU, three precision levels of $l_0$ were considered: $Z_{avg}$=3 mm/5 mm/7 mm, $E_a$=1%/2%/3% and CU=1%/2%/3%. To ensured the field surface relative elevation simulated sample meet the precision requirements on all performance parameters, depending on the allotment's type and precision requirement on the estimation interval, one should use the maximum number among the results for $Z_{avg}$, $E_a$ and CU for the given $S_d$ as the final minimum sample size for the simulation.

TABLE 7

The Minimum Sample Size for Field Surface Relative Elevation Simulation under Various Test Design Requirement

| Allotment Type | Field Irrigation Performance Parameter | Estimation Interval Precision $l_0$ | $S_d$/cm | | | | | |
|---|---|---|---|---|---|---|---|---|
| | | | 1 | 2 | 3 | 4 | 5 | 6 |
| Strip Allotment | $Z_{avg}$/mm | 3 | 1 | 18 | 55 | 78 | 107 | 150 |
| | | 5 | 1 | 7 | 20 | 28 | 39 | 54 |
| | | 7 | 1 | 4 | 11 | 15 | 20 | 28 |
| | $E_a$/% | 1 | 1 | 16 | 48 | 53 | 56 | 65 |
| | | 2 | 1 | 4 | 12 | 14 | 14 | 17 |
| | | 3 | 1 | 2 | 6 | 6 | 7 | 8 |
| | CU/% | 1 | 1 | 33 | 37 | 48 | 53 | 56 |
| | | 2 | 1 | 9 | 10 | 12 | 14 | 14 |
| | | 3 | 1 | 4 | 5 | 6 | 6 | 7 |
| Narrow Allotment | $Z_{avg}$/mm | 3 | 1 | 45 | 73 | 82 | 87 | 104 |
| | | 5 | 1 | 17 | 26 | 30 | 32 | 38 |
| | | 7 | 1 | 9 | 14 | 15 | 16 | 20 |
| | $E_a$/% | 1 | 1 | 24 | 33 | 38 | 40 | 45 |
| | | 2 | 1 | 6 | 9 | 10 | 10 | 12 |
| | | 3 | 1 | 3 | 4 | 5 | 5 | 5 |
| | CU/% | 1 | 1 | 14 | 19 | 23 | 24 | 28 |
| | | 2 | 1 | 4 | 5 | 6 | 6 | 7 |
| | | 3 | 1 | 2 | 3 | 3 | 3 | 4 |
| Wide Allotment | $Z_{avg}$/mm | 3 | 1 | 31 | 45 | 66 | 101 | 124 |
| | | 5 | 1 | 11 | 17 | 14 | 37 | 45 |
| | | 7 | 1 | 6 | 9 | 12 | 19 | 23 |
| | $E_a$/% | 1 | 1 | 26 | 31 | 35 | 45 | 49 |

TABLE 7-continued

The Minimum Sample Size for Field Surface Relative Elevation Simulation under Various Test Design Requirement

| Allotment Type | Field Irrigation Performance Parameter | Estimation Interval Precision $l_0$ | $S_d$/cm | | | | | |
|---|---|---|---|---|---|---|---|---|
| | | | 1 | 2 | 3 | 4 | 5 | 6 |
| | | 2 | 1 | 7 | 8 | 9 | 12 | 13 |
| | | 3 | 1 | 3 | 4 | 4 | 5 | 6 |
| | CU/% | 1 | 1 | 22 | 24 | 31 | 32 | 37 |
| | | 2 | 1 | 6 | 6 | 8 | 8 | 9 |
| | | 3 | 1 | 3 | 3 | 4 | 4 | 4 |

Based on the actual field survey data from 10 representative allotments (Table 8), all of which have different combination of allotment type and field surface relative elevation distribution (measured by its mean $\bar{z}$ and $S_d$ standard deviation of the field surface relative elevation data), use Table 7 to determine its corresponding minimum sample size m for randomly generated field surface relative elevation individuals. Next, factoring in other field irrigation technical elements, use two-dimensional surface irrigation model B2D to simulate field irrigation performance under m sets of stochastic simulated micro-topography condition and 1 set of actual field surveyed micro-topography condition, which produce their corresponding field irrigation performance parameters $Z_{avg}$, $E_a$ and CU. Finally, validate the reasonableness of the described micro-topography spatial variability simulation methodology by analyzing the difference between the actual field survey data and simulated data.

TABLE 8

Actual Field Survey Measurements from Representative Allotment and Its Corresponding Minimum Sample Size for Randomly Generated Field Surface Relative Elevation Individuals

| Allotment | Measurement/ m | Allotment Type | $\bar{z}$/cm | i/‰ | $S_d$/cm | Minimum Sample Size for Simulated Data m/Set |
|---|---|---|---|---|---|---|
| 1 | 100 × 20 | Narrow Allotment | 2.15 | 0 | 1.0 | 1 |
| 2 | 40 × 20 | Wide Allotment | 3.25 | 0.8 | 1.5 | 24 |
| 3 | 30 × 15 | Wide Allotment | 4.34 | 0 | 2.0 | 31 |
| 4 | 50 × 5 | Strip Allotment | 4.70 | 0.5 | 2.2 | 34 |
| 5 | 90 × 10 | Narrow Allotment | 8.47 | 0 | 2.7 | 64 |
| 6 | 150 × 20 | Narrow Allotment | 9.30 | 0 | 2.8 | 67 |
| 7 | 150 × 60 | Wide Allotment | 8.94 | 0 | 2.9 | 44 |
| 8 | 100 × 20 | Narrow Allotment | 7.10 | 0 | 3.0 | 73 |
| 9 | 50 × 5 | Strip Allotment | 7.06 | 0.8 | 3.3 | 62 |
| 10 | 30 × 15 | Wide Allotment | 8.68 | 0 | 4.0 | 66 |

TABLE 9

Field Performance Parameter Comparison between Actual Field Survey
Measurement and Randomly Generated Field Surface Relative Elevation Simulation

| Performance Parameters | Result Comparison | Allotment | | | | | | | | | |
|---|---|---|---|---|---|---|---|---|---|---|---|
| | | 1 | 2 | 3 | 4 | 5 | 6 | 7 | 8 | 9 | 10 |
| $Z_{avg}$/ mm | Actual Field Survey Measurement | 92.0 | 60.0 | 65.0 | 68.0 | 98.0 | 129.0 | 105.0 | 143.0 | 78.0 | 123.0 |
| | Simulation Maximum | 92.0 | 72.0 | 89.0 | 87.0 | 119.0 | 138.0 | 135.0 | 165.0 | 137.0 | 177.0 |
| | Simulation Minimum | 92.0 | 59.0 | 62.0 | 67.0 | 87.0 | 98.0 | 102.0 | 112.0 | 77.0 | 80.0 |
| | Simulation Average | 92.0 | 65.1 | 73.9 | 77.6 | 100.2 | 113.2 | 116.9 | 136.3 | 98.9 | 119.4 |
| $E_d$/% | Actual Field Survey Measurement | 64.0 | 90.0 | 84.0 | 80.0 | 62.0 | 45.0 | 56.0 | 41.0 | 69.0 | 49.0 |
| | Simulation Maximum | 65.0 | 90.0 | 85.0 | 81.0 | 66.0 | 61.0 | 59.0 | 52.0 | 71.0 | 66.0 |
| | Simulation Minimum | 65.0 | 82.0 | 67.0 | 68.0 | 50.0 | 43.0 | 44.0 | 36.0 | 44.0 | 34.0 |
| | Simulation Average | 65.0 | 85.7 | 77.2 | 73.8 | 59.2 | 53.2 | 51.3 | 44.1 | 59.2 | 50.0 |
| CU/% | Actual Field Survey Measurement | 86.0 | 78.0 | 75.0 | 73.0 | 79.0 | 83.0 | 78.0 | 82.0 | 67.0 | 73.0 |
| | Simulation Maximum | 87.0 | 85.0 | 83.0 | 80.0 | 82.0 | 84.0 | 83.0 | 82.0 | 80.0 | 82.0 |
| | Simulation Minimum | 87.0 | 73.0 | 73.0 | 71.0 | 76.0 | 77.0 | 75.0 | 74.0 | 66.0 | 60.0 |
| | Simulation Average | 87.0 | 79.3 | 78.3 | 76.9 | 78.2 | 79.7 | 79.1 | 77.3 | 72.0 | 72.4 |

As the comparison results showed in Table 9, the field irrigation performance parameters corresponding to actual field survey surface relative elevation fall within the range of the minimum and the maximum of that corresponding to the randomly generated field surface relative elevation simulation data set. The actual field survey measurement can be considered as a subset that is included within the simulated data set.

Field micro-topography spatial variability usually is described by micro-terrain's undulation and its corresponding undulation distribution variation. A single set of field surface relative elevation from actual field survey data only reflects one particular undulation distribution in a specified micro-terrain. Using the simulated field surface relative elevation data, which was generated based on the minimum sample size m requirement, one can use limited amount of data to describe the overall undulation distribution variation in a specified micro-terrain, and calculate the range of distribution regarding the impact of the overall difference on the field irrigation performance parameters (see Table 9).

Figure 5:
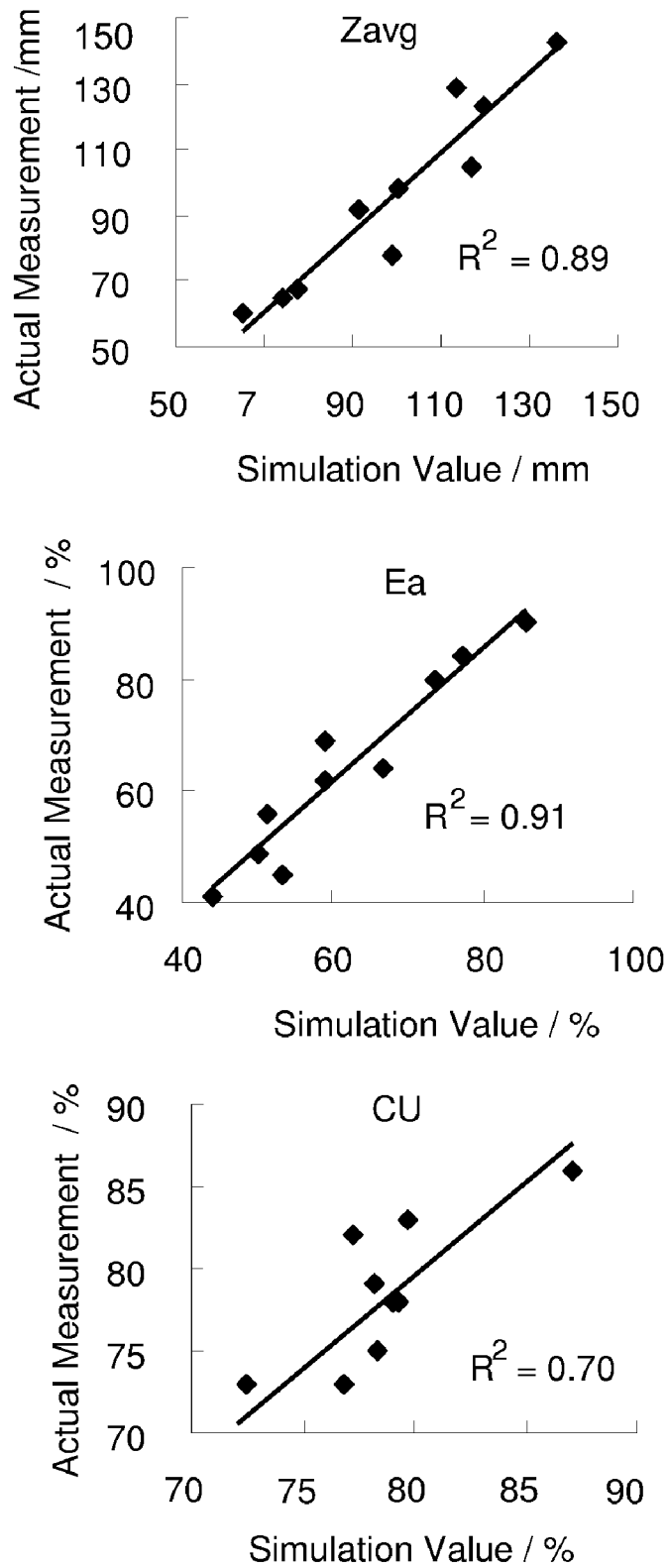
FIG. 5 is a scatter plot on field survey data vs. random generation of field surface relative elevation data on key surface irrigation performance evaluation parameters according to another embodiment of the invention.

FIG. 5 is a comparison between irrigation performance parameters corresponding to actual field survey results and that of corresponding to simulated field surface relative elevation data based on requirement of the minimum sample size m. The correlation coefficients for $Z_{avg}$, $E_a$ and CU are 0.94, 0.95 and 0.84. Based on the result, one can conclude that the measurement from actual field survey can be substituted by either the mean of the simulated field surface relative elevation data that met the minimum sample size requirement m, or by the single individual among m set simulated data that is closest to the actual measurement. For a specified micro-terrain, using the mean substitution would reflect the impact of the overall undulation distribution variation on field irrigation performance parameters, while the latter one only reflect the impact at one particular undulation distribution.

From all of the above, it can be concluded that using minimum sample based simulation approach, the randomly generated field surface relative elevation simulation data that represents micro-topography spatial variability can achieve a better and more accurate result on representing the overall undulation spatial variability difference, and derive the range of its impact on field irrigation performance. The innovative micro-topography stochastic simulation methodology described here provides an essential supporting condition and reliable tool that can be utilized in micro-topography undulation simulation and research on the impact of undulation spatial variability on field irrigation performance.

EXAMPLE

Surface Irrigation Land Leveling Precision Design

A lot of 100 m×400 m in Changpin, Beijing requires surface irrigation land leveling precision design. Currently, the standard deviation of its field micro-terrain $S_d$ is 10.5 cm. The irrigation water source is groundwater, and its water yield is 108 m³/h. A proposal for reasonable land leveling precision through optimum design is required.

When determining the optimum design for the land leveling, several precision levels are considered, including $S_d$=6.5 cm, 5.5 cm, 4.5 cm, 3.5 cm, 2.5 cm and 1.5 cm. Using the methodology described in the invention, for each corresponding $S_d$, one can generate m sets of micro-terrain data, all of which share the same $S_d$ but have different spatial variability of terrain undulation positions. The land leveling cost can be obtained using the land leveling design software.

The total irrigation volume can be derived from the irrigation model. Based on the established relationship between the land leveling precision and wheat yield through previous field experiments, the corresponding wheat yield quantity can be calculated. The given price of wheat is 1.1 yuan/kg and the water rate is 0.02 yuan/m³.

Table 1 lists the leveling cost, water fee cost and crop output value under different land leveling precision levels. As the land leveling precision improves, or as $S_d$ decreases, the leveling cost increases, the crop output value also increases, and water fee cost decreases. Assuming the cost of fertilization and pesticide is the same at all level precision levels, the optimum land leveling design should maximize the remainder of the crop output value minus water fee and land leveling cost.

As shown in Table 1, when $S_d$=2.5 cm, the remainder of the value of crop output minus water fee and land leveling cost is maximized. Therefore, the land level precision should be 2.5 cm in the optimum design.

TABLE 1

Leveling Cost, Water Fee and Crop Output Value under Different Leveling Precision Levels

| | Leveling Precision/cm | | | | | |
|---|---|---|---|---|---|---|
| | 6.5 | 5.5 | 4.5 | 3.5 | 2.5 | 1.5 |
| Leveling Cost/ RMB/hm² | 1066 | 1246 | 1416 | 1577 | 1731 | 1880 |
| Crop Output Value/ RMB/hm² | 4961 | 5582 | 5815 | 6088 | 6473 | 6572 |
| Water Fee/ RMB/hm² | 94 | 89 | 84 | 80 | 77 | 75 |
| Crop Output Value − Leveling Cost − Water Fee/ RMB/hm² | 3801 | 4247 | 4315 | 4431 | 4664 | 4616 |

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A method for determining relative elevation values of an allotment by using a computer, the allotment comprising a surface having a length L, a width W, and a plurality of nodes i, wherein the total number of said nodes is n; i is a first integral variable and is in the range of [1,n]; said nodes have a row spacing dy and a column spacing dx; and each of said nodes has a relative elevation value relative to said surface; said relative elevation values have a mean $\bar{z}$ and a standard deviation $S_d$; the method comprising:

a) generating an initial data set of said relative elevation values comprising $z_1^0, z_2^0, \ldots,$ and $z_n^0$ by using Monte-Carlo simulation by:

a1) entering into the computer values for allotment parameters, the allotment parameters being the length L, the width W, the row spacing dy, the column spacing dx, the mean $\bar{z}$, and the standard deviation $S_d$, and setting i equal to 1;

a2) by means of the computer, calculating n, wherein n=(L/dy+1)(W/dx+1);

a3) by means of the computer, randomly generating an evenly distributed number r, wherein r is between [0,1];

a4) by means of the computer, determining z from the following equation:

$$\int_{-\infty}^{z} \frac{1}{S_d \sqrt{2\pi}} \exp\left[-\frac{1}{2}\left(\frac{z-\bar{z}}{S_d}\right)^2\right] dz = r;$$

a5) by means of the computer, determining whether z falls into the numerical range of $[\bar{z}-3S_d, \bar{z}+3S_d]$; when z falls into the numerical range of $[\bar{z}-3S_d, \bar{z}+3S_d]$, obtaining an initial relative elevation value $z_i^0$ for the $i^{th}$ node through $z_i^0=z$ and continuing to a6); and when z does not fall into the numerical range of $[\bar{z}-3S_d, \bar{z}+3S_d]$, returning to a3); and a6) by means of the computer, determining whether i=n; when i=n, continuing to b); when i is not equal to n, increasing i by 1 and returning to a3);

b) by means of the computer, adjusting the initial data set to establish a first adjusted data set of said relative elevation values having spatial dependence and comprising $z_1^1, z_2^1, \ldots,$ and $z_n^1$ by:

b1) determining an allotment type of the allotment from the length L and the width W, wherein the allotment type is a strip type, a narrow type, or a wide type; the strip type has a ratio of the length L to the width W larger than 3 and an absolute value of the width W smaller than 10 m; the narrow type has a ratio of the length L to the width W larger than 3 and an absolute value of the width W larger than or equal to 10 m; and the wide type has a ratio of the length L to the width W smaller than 3 and an absolute value of the width W larger than or equal to 10 m;

b2) calculating spatial variation parameters $C_0$, $C_0+C$, and R from the following empirical formulas for the strip type, $C_0=0.21S_d^2$, $(C_0+C)=S_d^2$, and $R=0.18L+1.53$;

for the narrow type, $C_0=0.34S_d^2$, $(C_0+C)=S_d^2$ and $R=0.21L-4.11$; and for the wide type, $C_0=0.32S_d^2$, $(C_0+C)=S_d^2$, and $R=16.69(L*W)+5.26$;

wherein $S_d^2$ is the square of $S_d$; $C_0$ is a nugget, $C_0+C$ is a sill, and R is a range; and calculating a spatial structure function $\gamma(h)$ for said relative elevation values from the following formula:

$$Y(h) = \begin{cases} 0 & h=0 \\ C_0 + C \cdot \left(\frac{3}{2} \cdot \frac{h}{R} - \frac{1}{2} \cdot \frac{h^3}{R^3}\right) & 0 < h \leq R \\ C_0 + C & h > R \end{cases}$$

wherein h is a spacing distance between two of said nodes;

b3) calculating spatial-position weight coefficients of said nodes using Kriging interpolation, wherein the weight coefficient of the $j^{th}$ node is $\lambda_j$, j is a second integral variable, and j is in the range of [1,n]; and b4) calculating the first adjusted data set from the following equation:

$$z_j^1 = \Sigma_{k=1}^M \lambda_k z_k^0,$$

wherein k is a third integral variable, k is in a range of [1,n], M is an amount of surrounding nodes of said nodes and each of said surrounding nodes has a distance from the $j^{th}$ node smaller than or equal to R; $z_j^1$ is a relative elevation value of said first adjusted data set and $z_k^0$ is a relative elevation value of said initial data set;

c) by means of the computer, making statistical parameter corrections to the first adjusted data set to obtain a final data set of said relative elevation values comprising $z_1^3$, $z_2^3$, ..., and $z_n^3$ by:

c1) making a mean correction of the first adjusted data set to form a second adjusted data set comprising $z_1^2$, $z_2^2$, ..., and $z_n^2$ by using the following equation:

$$z_j^2 = \frac{\bar{z}}{\bar{z}^1} \cdot z_j^1,$$

wherein $\bar{z}^1$ is a mean of the first adjusted data set; and c2) making a standard deviation correction to the second adjusted data set to form the final data set by using the following equation:

$$z_j^3 = (z_j^2 - \bar{z}) \cdot \frac{S_d}{S_d^2} + \bar{z},$$

wherein $S_d^2$ is a standard deviation of the second adjusted data set;

d) saving the final data set of said relative elevation values; and e) determining elevation distribution of the allotment based on said final data set of said relative elevation values saved in step d) and fixing the elevation distribution of the allotment on a physical medium.

2. In a method for saving water used to irrigate an allotment, the improvement comprising more accurately determining relative elevation values of an allotment by using a computer, the allotment comprising a surface having a length L, a width W, and a plurality of nodes i, wherein the total number of said nodes is n; i is a first integral variable and is in the range of [1,n]; said nodes have a row spacing dy and a column spacing dx; and each of said nodes has a relative elevation value relative to said surface; said relative elevation values have a mean $\bar{z}$ and a standard deviation $S_d$; the method comprising 1) determining relative elevation values of the allotment by following steps a) through d):

a) generating an initial data set of said relative elevation values comprising $z_1^0$, $z_2^0$, ..., and $z_n^0$ by using Monte-Carlo simulation by:

a1) entering into the computer values for allotment parameters, the allotment parameters being the length L, the width W, the row spacing dy, the column spacing dx, the mean $\bar{z}$, and the standard deviation $S_d$, and setting i equal to 1;

a2) by means of the computer, calculating n, wherein n=(L/dy+1)(W/dx+1);

a3) by means of the computer, randomly generating an evenly distributed number r, wherein r is between [0,1];

a4) by means of the computer, determining z from the following equation:

$$\int_{-\infty}^{z} \frac{1}{S_d \sqrt{2\pi}} \exp\left[-\frac{1}{2}\left(\frac{z-\bar{z}}{S_d}\right)^2\right] dz = r;$$

a5) by means of the computer, determining whether z falls into the numerical range of $[\bar{z}-3S_d, \bar{z}+3S_d]$; when z falls into the numerical range of $[\bar{z}-3S_d, \bar{z}+3S_d]$, obtaining an initial relative elevation value $z_i^0$ for the $i^{th}$ node through $z_i^0 = z$ and continuing to a6); and when z does not fall into the numerical range of $[\bar{z}-3S_d, \bar{z}+3S_d]$, returning to a3); and a6) by means of the computer, determining whether i=n; when i=n, continuing to b); when i is not equal to n, increasing i by 1 and returning to a3);

b) by means of the computer, adjusting the initial data set to establish a first adjusted data set of said relative elevation values having spatial dependence and comprising $z_1^1$, $z_2^1$, ..., and $z_n^1$ by:

b1) determining an allotment type of the allotment from the length L and the width W, wherein the allotment type is a strip type, a narrow type, or a wide type; the strip type has a ratio of the length L to the width W larger than 3 and an absolute value of the width W smaller than 10 m; the narrow type has a ratio of the length L to the width W larger than 3 and an absolute value of the width W larger than or equal to 10 m; and the wide type has a ratio of the length L to the width W smaller than 3 and an absolute value of the width W larger than or equal to 10 m;

b2) calculating spatial variation parameters $C_0$, $C_0+C$, and R from the following empirical formulas for the strip type, $C_0=0.21S_d^2$, $(C_0+C)=S_d^2$, and $R=0.18L+1.53$;

for the narrow type, $C_0=0.34S_d^2$, $(C_0+C)=S_d^2$, and $R=0.21L-4.11$; and for the wide type, $C_0=0.32S_d^2$, $(C_0+C)=S_d^2$, and $R=16.69(L*W)+5.26$;

wherein $S_d^2$ is the square of $S_d$, $C_0$ is a nugget, $C_0+C$ is a sill, and R is a range; and calculating a spatial structure function $\gamma(h)$ for said relative elevation values from the following formula:

$$Y(h) = \begin{cases} 0 & h = 0 \\ C_0 + C \cdot \left(\frac{3}{2} \cdot \frac{h}{R} - \frac{1}{2} \cdot \frac{h^3}{R^3}\right) & 0 < h \le R \\ C_0 + C & h > R \end{cases}.$$

wherein h is a spacing distance between two of said nodes;

b3) calculating spatial-position weight coefficients of said nodes using Kriging interpolation, wherein the weight coefficient of the $j^{th}$ node is $\lambda_j$, j is a second integral variable, and j is in the range of [1,n]; and b4) calculating the first adjusted data set from the following equation:

$$z_j^1 = \sum_{k=1}^{M} \lambda_k z_k^0,$$

wherein k is a third integral variable, k is in a range of [1,n], M is an amount of surrounding nodes of said nodes and each of said surrounding nodes has a distance from the $j^{th}$ node smaller than or equal to R; $z_j^1$ is a relative elevation value of said first adjusted data set and $z_k^0$ is a relative elevation value of said initial data set;

c) by means of the computer, making statistical parameter corrections to the first adjusted data set to obtain a final data set of said relative elevation values comprising $z_1^3, z_2^3, \ldots,$ and $z_n^3$ by:

c1) making a mean correction of the first adjusted data set to form a second adjusted data set comprising $z_1^2, z_2^2, \ldots,$ and $z_n^2$ by using the following equation:

$$z_j^2 = \frac{\bar{z}}{\bar{z}^1} \cdot z_j^1,$$

wherein $\bar{z}^1$ is a mean of the first adjusted data set; and c2) making a standard deviation correction to the second adjusted data set to form the final data set by using the following equation:

$$z_j^3 = (z_j^2 - \bar{z}) \cdot \frac{S_d}{S_d^2} + \bar{z},$$

wherein $S_d^2$ is a standard deviation of the second adjusted data set; and d) saving the final data set of said relative elevation values and 2) calculating the precise water requirement using the two-dimensional field irrigation model B2D (Basin 2 Dimensions) based on said final data set of said relative elevation values saved in step d) to avoid irrigating the allotment with excess water.

3. In a method for determining topography of an allotment, the improvement comprising more accurately determining relative elevation values of an allotment by using a computer, the allotment comprising a surface having a length L, a width W, and a plurality of nodes i, wherein the total number of said nodes is n; i is a first integral variable and is in the range of [1,n]; said nodes have a row spacing dy and a column spacing dx; and each of said nodes has a relative elevation value relative to said surface; said relative elevation values have a mean $\bar{z}$ and a standard deviation $S_d$; the method comprising:

1) determining relative elevation values of the allotment by following steps a through d:

a) generating an initial data set of said relative elevation values comprising $z_1^0, z_2^0, \ldots,$ and $z_n^0$ by using Monte-Carlo simulation by:

a1) entering into the computer values for allotment parameters, the allotment parameters being the length L, the width W, the row spacing dy, the column spacing dx, the mean $\bar{z}$, and the standard deviation $S_d$, and setting i equal to 1;

a2) by means of the computer, calculating n, wherein n=(L/dy+1)(W/dx+1);

a3) by means of the computer, randomly generating an evenly distributed number r, wherein r is between [0,1];

a4) by means of the computer, determining z from the following equation:

$$\int_{-\infty}^{z} \frac{1}{S_d \sqrt{2\pi}} \exp\left[-\frac{1}{2}\left(\frac{z-\bar{z}}{S_d}\right)^2\right] dz = r;$$

a5) by means of the computer, determining whether z falls into the numerical range of $[\bar{z}-3S_d, \bar{z}+3S_d]$; when z falls into the numerical range of $[\bar{z}-3S_d, \bar{z}+3S_d]$, obtaining an initial relative elevation value $z_i^0$ for the $i^{th}$ node through $z_i^0 = z$ and continuing to a6); and when z does not fall into the numerical range of $[\bar{z}-3S_d, \bar{z}+3S_d]$, returning to a3); and a6) by means of the computer, determining whether i=n; when i=n, continuing to b); when i is not equal to n, increasing i by 1 and returning to a3);

b) by means of the computer, adjusting the initial data set to establish a first adjusted data set of said relative elevation values having spatial dependence and comprising $z_1^1, z_2^1, \ldots,$ and $z_n^1$ by:

b1) determining an allotment type of the allotment from the length L and the width W, wherein the allotment type is a strip type, a narrow type, or a wide type; the strip type has a ratio of the length L to the width W larger than 3 and an absolute value of the width W smaller than 10 m; the narrow type has a ratio of the length L to the width W larger than 3 and an absolute value of the width W larger than or equal to 10 m; and the wide type has a ratio of the length L to the width W smaller than 3 and an absolute value of the width W larger than or equal to 10 m;

b2) calculating spatial variation parameters $C_0$, $C_0+C$, and R from the following empirical formulas for the strip type, $C_0=0.21 S_d^2$, $(C_0+C)=S_d^2$, and $R=0.18L+1.53$;

for the narrow type, $C_0=0.34 S_d^2$, $(C_0+C)=S_d^2$, and $R=0.21L-4.11$; and for the wide type, $C_0=0.32 S_d^2$, $(C_0+C)=S_d^2$, and $R=16.69(L*W)+5.26$;

wherein $S_d^2$ is the square of $S_d$, $C_0$ is a nugget, $C_0+C$ is a sill, and R is a range; and calculating a spatial structure function $\gamma(h)$ for said relative elevation values from the following formula:

$$\gamma(h) = \begin{cases} 0 & h = 0 \\ C_0 + C \cdot \left(\frac{3}{2} \cdot \frac{h}{R} - \frac{1}{2} \cdot \frac{h^3}{R^3}\right) & 0 < h \le R \\ C_0 + C & h > R \end{cases}$$

wherein h is a spacing distance between two of said nodes;

b3) calculating spatial-position weight coefficients of said nodes using Kriging interpolation, wherein the weight coefficient of the $j^{th}$ node is $\lambda_j$, j is a second integral variable, and j is in the range of [1,n]; and b4) calculating the first adjusted data set from the following equation:

$$z_j^1 = \Sigma_{k=1}^M \lambda_k z_k^0,$$

wherein k is a third integral variable, k is in a range of [1,n], M is an amount of surrounding nodes of said nodes and each of said surrounding nodes has a distance from the $j^{th}$ node smaller than or equal to R; $z_j^1$ is a relative elevation value of said first adjusted data set and $z_k^0$ is a relative elevation value of said initial data set;

c) by means of the computer, making statistical parameter corrections to the first adjusted data set to obtain a final data set of said relative elevation values comprising $z_1^3, z_2^3, \ldots,$ and $z_n^3$ by:

c1) making a mean correction of the first adjusted data set to form a second adjusted data set comprising $z_1^2, z_2^2, \ldots,$ and $z_n^2$ by using the following equation:

$$z_j^2 = \frac{\bar{z}}{\bar{z^1}} \cdot z_j^1,$$

wherein $\overline{z^1}$ of the first adjusted data set; and c2) making a standard deviation correction to the second adjusted data set to form the final data set by using the following equation:

$$z_j^3 = (z_j^2 - \bar{z}) \cdot \frac{S_d}{s_d^2} + \bar{z},$$

wherein $S_d^2$ is a standard deviation of the second adjusted data set; and d) saving the final data set of said relative elevation values; and 2) determining topography of the allotment by determining elevation distribution of the allotment based on said final data set of said relative elevation values saved in step d), and fixing topography of the allotment on a physical medium.

4. In a method for saving water used to irrigate an allotment, the allotment comprising a surface having a length L, a width W, and a plurality of nodes i, wherein the total number of said nodes is n; i is a first integral variable and is in the range of [1,n]; said nodes have a row spacing dy and a column spacing dx; and each of said nodes has a relative elevation value relative to said surface; said relative elevation values have a mean $\bar{z}$ and a standard deviation $S_d$; the improvement comprising:

i) generating a plurality of data sets of said relative elevation values using the method of claim 2;

ii) simulating irrigation performance by using two-dimensional field irrigation model B2D (Basin 2 Dimensions) based on said plurality of sets of relative elevation values generated in i) to obtain a first deviation standard C for average water depth $Z_{avg}$, a second deviation standard $\sigma_2$ for irrigation efficiency $E_a$, and a third deviation standard $\sigma_3$ for irrigation uniformity CU; wherein the average water depth $Z_{avg}$, the irrigation efficiency $E_a$ and the irrigation uniformity CU are parameters for evaluating irrigation performance;

iii) calculating $m_1, m_2,$ and $m_3$ from the following equations:

$$m_1 = \left(\sigma_1 \cdot \frac{z_{\alpha/2}}{1_s}\right)^2;$$

$$m_2 = \left(\sigma_2 \cdot \frac{z_{\alpha/2}}{1_s}\right)^2;$$

$$m_3 = \left(\sigma_3 \cdot \frac{z_{\alpha/2}}{1_s}\right)^2; \text{ and}$$

setting a minimum number m of sets of relative elevation values to equal $m_1, m_2,$ or $m_3$, whichever is largest;

wherein $Z_{\alpha/2}$ is the quantile of a standard normal distribution under the confidence level $\alpha$; $2l_1$ is the confidence interval length for the average water depth $Z_{avg}$; $2l_2$, is the confidence interval length for the irrigation efficiency $E_a$; $2l_3$ is the confidence interval length for the irrigation uniformity CU;

iv) generating at least a minimum number m sets of said relative elevation values using the method of claim 2; and v) simulating irrigation performance by using two-dimensional field irrigation model B2D based on said minimum number m sets of relative elevation values generated in iv).

* * * * *